Figure 1:
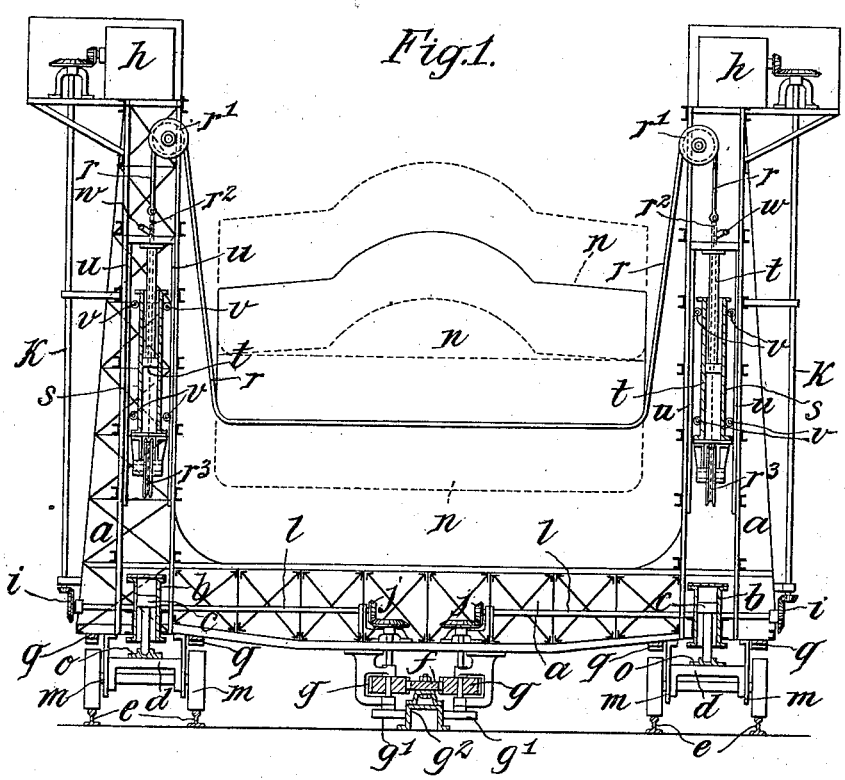

No. 728,117. PATENTED MAY 12, 1903.
B. KIRSCH, C. V. SUPPAN & B. SZENDI.
SHIP RAILWAY CARRIAGE.
APPLICATION FILED APR. 12, 1902.
NO MODEL. 4 SHEETS—SHEET 1.

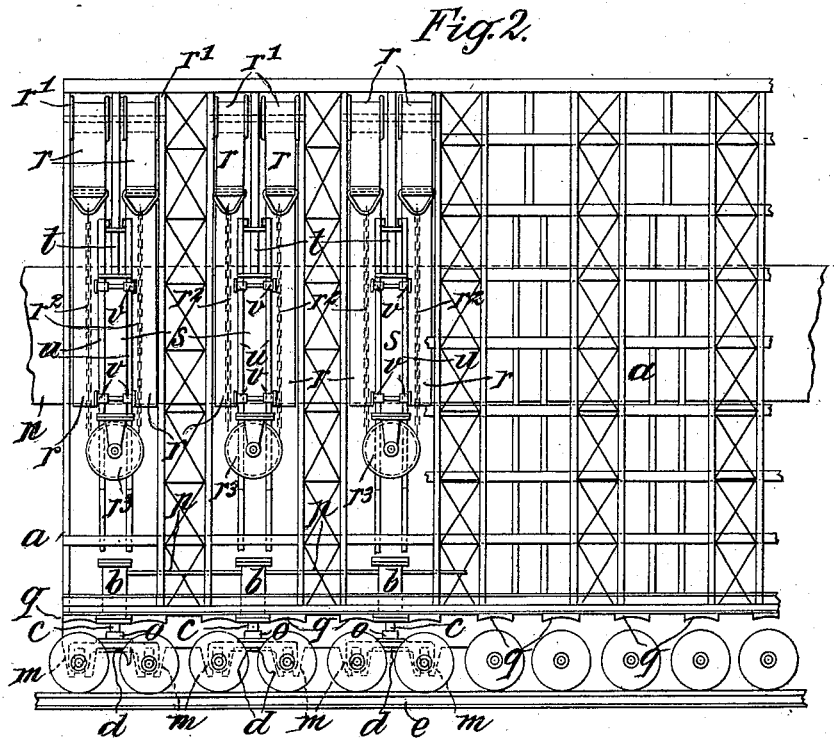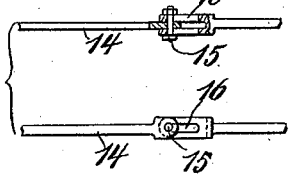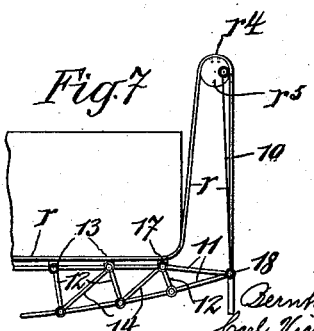

No. 728,117. PATENTED MAY 12, 1903.
B. KIRSCH, C. V. SUPPAN & B. SZENDI.
SHIP RAILWAY CARRIAGE.
APPLICATION FILED APR. 12, 1902.
NO MODEL. 4 SHEETS—SHEET 3.

No. 728,117. PATENTED MAY 12, 1903.
B. KIRSCH, C. V. SUPPAN & B. SZENDI.
SHIP RAILWAY CARRIAGE.
APPLICATION FILED APR. 12, 1902.
NO MODEL. 4 SHEETS—SHEET 4.
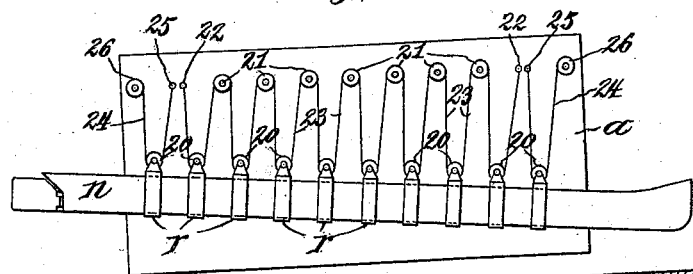
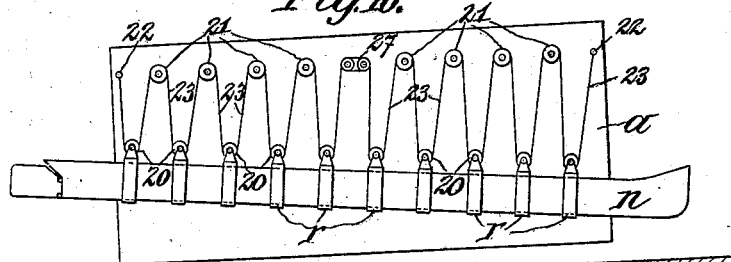
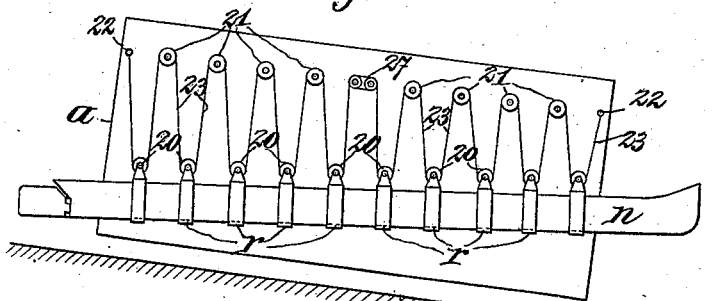

No. 728,117. Patented May 12, 1903.

UNITED STATES PATENT OFFICE.

BERNHARD KIRSCH AND CARL VICTOR SUPPAN, OF VIENNA, AND BÉLA SZENDI, OF BUDAPEST, AUSTRIA-HUNGARY.

SHIP-RAILWAY CARRIAGE.

SPECIFICATION forming part of Letters Patent No. 728,117, dated May 12, 1903.

Application filed April 12, 1902. Serial No. 102,676. (No model.)

*To all whom it may concern:*

Be it known that we, BERNHARD KIRSCH and CARL VICTOR SUPPAN, residing at Vienna, and BÉLA SZENDI, residing at Budapest, Austria-Hungary, subjects of the Emperor of Austria-Hungary, have invented certain new and useful Improvements in Ship-Railway Carriages; and we do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to a construction of carriages or transporting apparatus on wheels by means of which loaded boats or ships can be transported between two waterways, rivers, or canal-sections without locks or expenditure of water. This carriage or transporting apparatus consists of a strong framing of a trough shape, open at both ends for receiving the boat or ship while on the water and is provided with transverse flexible supports or belts, on which the boat or ship rests when lowered onto them by lowering the water-level, the said belts having their ends carried by hydraulic cylinders situated in the side frames of the carriage, this being supported on road-wheels mounted in separate frames that are carried by other hydraulic cylinders, also situated in the side frames of the carriage. By means of the first-named hydraulic cylinders and belts the boat or ship can be uniformly supported along its entire length in a horizontal position notwithstanding any inclination the carriage may assume in traveling over the ground, while by means of the last-named hydraulic cylinders the road-wheels can be adjusted relatively to the carriage, so as to support this more or less equally along its whole length notwithstanding that it may be traveling over undulating or uneven ground. The first-named hydraulic cylinders extend in a row along the whole length of the carriage, on each side thereof, and each row is divided into two groups, all the cylinders of a group being made to communicate with each other, so that the load carried by each group will be supported equally by all the cylinders of that group, while at the same time should the boat or ship be loaded to a greater extent at one end than at the other the groups of hydraulic cylinders will prevent any sinking of the same at the heavier end. The hydraulic cylinders that support the carriage are in like manner arranged in a row on each side thereof and divided into two groups, the cylinders of each group being made to intercommunicate, so as to distribute the load equally on the wheels, while the separate groups prevent the carriage from sinking at the heavier loaded end. Force-pumps are provided both for charging the hydraulic cylinders to the required degree from the outside, as also for transferring the water from one group of the hydraulic cylinders to the other when required. For distributing the strain more equally throughout each supporting-belt when the boat or ship has a flat bottom there is interposed between the belt and the ship's bottom a suitably-curved saddle-piece, so as to keep that part of the belt in correspondingly-curved position. The ship may also be supported upon specially-arranged articulated transverse bearers situated under the belts and suitably carried at their ends and applicable both for flat-bottomed and for keel vessels, being constructed in such manner as to adapt themselves to the configuration of the ship's bottom and to afford flat-bottomed vessels a perfectly uniform support in the direction transversely to the longitudinal axis and in the case of other vessels to afford an approximately uniform support. The belts do not in this case serve as support to the ship, but only for protecting the ship's sides or the transverse bearers.

We will proceed to describe the preceding invention with reference to the accompanying drawings, in which—

Figure 4:
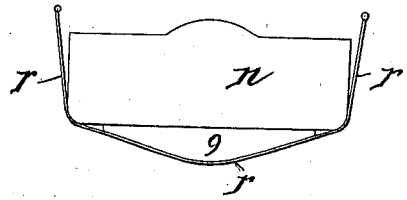
Figure 3:
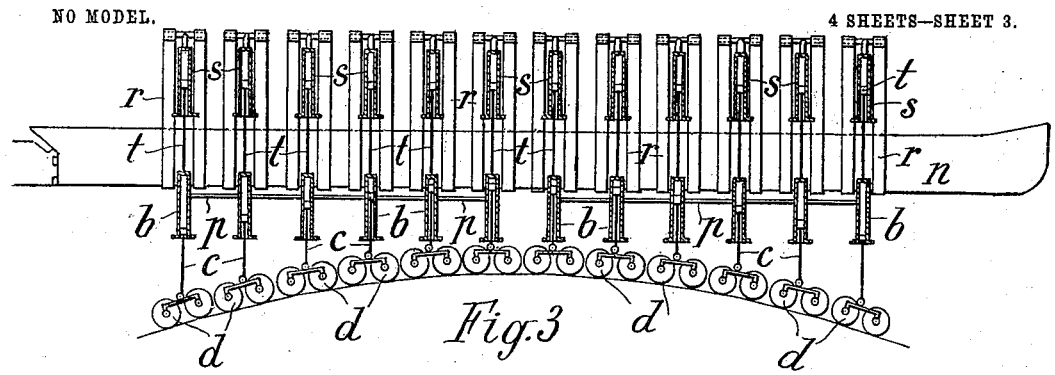
Figure 5:
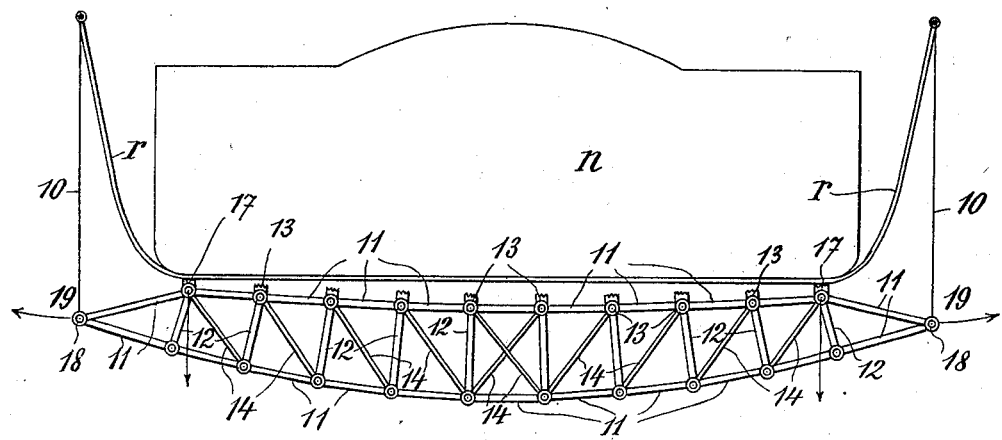
Figure 8:
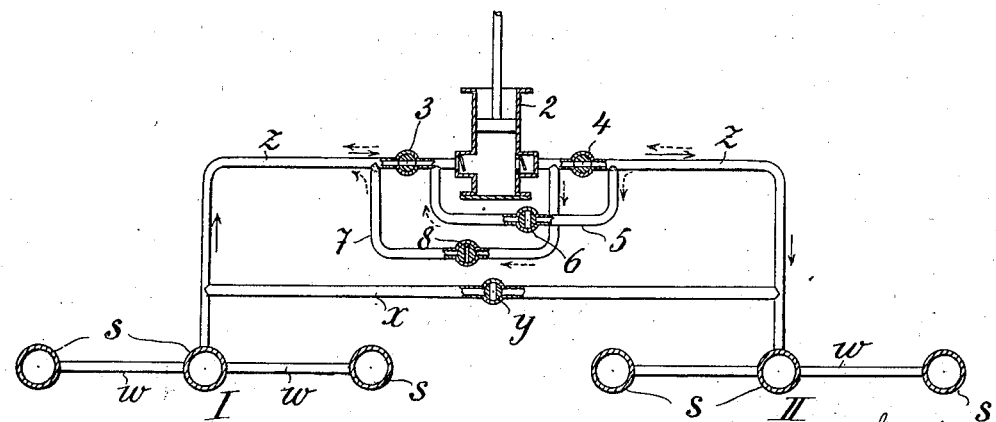

Figure 1 shows an end view, partly in section, of the carriage and apparatus in connection therewith. Fig. 2 shows a part side view. Fig. 3 shows a diagrammatic side view of the carriage with a boat thereon while passing over a vertically-curved part of the railway. Fig. 4 shows the end view of a vessel supported by the bands and saddle-pieces detached. Fig. 5 shows the application of articulated transverse bearers for supporting the ship's bottom. Fig. 6 shows a separate side view and sectional plan of part of one of the diagonal ties of the articulated bearer. Fig. 7 shows a modified arrangement for the suspension of the articulated bearer. Fig. 8 shows a diagram of the arrangement of pipes and cocks or valves for distributing the fluid-pressure to the hydraulic cylinders. Figs. 9, 10, and 11 show diagrammatic views of the carriage and boat, wherein the hydraulic cylinders are replaced by means of cords and chains laid backward and forward over movable guide-rollers.

$a$ is the body of the carriage, consisting of a bottom part and two vertical side parts, and each rests upon a series of wheel-axle frames $d$ by means of hydraulic cylinders $b$, fixed to the frame and having pistons or plungers $c$ bearing upon the wheel-frames. The wheels of these frames run upon rails $e$, between which is arranged a double-toothed rack $f$, with the teeth of which are engaged upon both sides toothed wheels $g$, that are driven by means of motors $h$, such as electromotors, through the medium of transmission-shafts $k\,l$, coupled together by means of bevel-wheels $i\,j$. This driving apparatus is arranged at each end of the carriage. The wheels of the frames $d$ are made without flanges, of such a width that the wheels situated at the middle of the carriage will remain upon the rails when the carriage is passing around the greatest allowable curves of the railway.

The correct engagement of the toothed wheels and the guiding of the carriage when running on the curves are effected by guide-rollers $g'$, fixed to the axes of the toothed wheels $g$, which guide-rollers run upon the vertical side faces of the base $g^2$, that carries the toothed rack; but wheel-frames $d$ are held against lateral shifting by means of the horn-plates $m$ of the axle-bearings. The above-mentioned hydraulic cylinders $b$ serve the purpose of distributing the weight of the carriage-body uniformly upon all the wheel-frames and at the same time to render it possible that on the carriage traveling over vertical curves, as at Fig. 3, the vertical distances of the carriage-frame from the surface of the rails can be varied between certain limits. For this purpose it is necessary to effect a communication between the hydraulic cylinders $b$ in order that the liquid in these cylinders may be distributed throughout the connected cylinders in accordance with the varied distances of the points of the carriage-frame from the top surfaces of the rails. If, however, all the hydraulic cylinders on one side of the carriage were to be connected together by pipes, this would have the result that on the two longitudinal halves of the carriage being unequally loaded this would sink down at the end which is situated nearest to the center of gravity to such an extent that the flanges of the two cylinders situated at that end would bear upon the supports $o$ of the piston-rods or plungers, while the opposite end of the carriage would be forced upward by the displaced fluid under pressure. In order to obviate this difficulty, only those cylinders $b$ which belong to one half of the carriage on each side are coupled together by means of pipes $p$, Figs. 2 and 3. Thus if the one end of the carriage be loaded to a greater extent than the other end the pressure in the two separate systems of hydraulic cylinders will be unequal. This, however, is practically a smaller evil than the above-mentioned tilting of the carriage-body, and it will be seen that the cylinder group which is subjected to the greater pressure will at most be subject to that pressure which is produced in both groups when the load is distributed in a perfectly uniform manner throughout the ship and carriage. In this arrangement there will be combined an emergency-brake device, which is formed by brake-blocks $q$, fixed to the under side of the carriage-frame above each of the wheels, as indicated at Figs. 1 and 2. If, namely, the pressure fluid be allowed to escape simultaneously from both cylinder groups, the carriage-body will sink and the brake-blocks will bear upon the tops of the wheels, which will thus be braked in a most effective manner. This brake device can therefore only be employed when the carriage is running down a straight incline; but it is also only in such a case that the braking would be required.

For supporting the ship or boat $n$ to be transported there are provided a number of belts or bands $r$, arranged transversely on the carriage-frame, which belts are connected to the hydraulic cylinders $s$. These cylinders can move vertically up and down upon pistons or plungers $t$, which are rigidly attached at their upper ends on the carriage-frame, the cylinders being guided through such vertical motion by means of rollers $v$ running upon guide-rails $u$. In the construction shown at Figs. 1 and 2 the belts $r$ are passed over guide-rollers $r'$, running in bearings fixed on the side frames of the carriage, and each two belts have their ends connected together by means of chains $r^2$, which pass around rollers $r^3$, carried by the lower end of the hydraulic cylinders. These cylinders are pressed downward by means of the fluid-pressure admitted thereto. The belts $r$ can therefore be connected directly to the upper ends of the hydraulic cylinders $s$, which in this case are arranged above the pistons $t$, fixed by their lower ends to the carriage, as shown in Fig. 3, the cylinders being in this case pressed upward by the pressure fluid. These hydraulic cylinders $s$, which serve to maintain the ship always in a horizontal position or to bring it into such position, form at each side of the carriage two groups I and II, adjoining each other at the middle of the carriage, as at Fig. 8, the two groups being ordinarily separated from each other, but capable of being made to communicate with each other either directly or through the medium of a special force-pump. Fig. 8 shows a diagram of the two cylinder groups and their pipe connections on one side of the carriage, the cylinder s of each group communicating with each other by means of pipes w.

x is a pipe provided with a cock y and serving to connect the group I with the group II. A second pipe z, which also connects the two groups, is provided with a pump 2, a pump which is preferably actuated by a special motor. Pipe z is provided on each side of the pump with a cock 3 and 4.

5 is pipe provided with a cock 6, which extends from the part of the pipe z nearest the suction-valve of the pump to the part of the pipe z which leads to the cylinders of group II.

7 is a pipe provided with a cock 8, which connects the pressure-pipe of the pump with the part of the pipe z leading to the group I.

The cocks 3 4 6 8 are generally closed, so that the weight of the one half of the ship is distributed upon the cylinders of group II. Consequently in the event of the central gravity of the ship not being situated in the middle of the carriage any tipping of the ship in the longitudinal direction cannot take place.

If, for example, the right-hand end of the ship is to be raised, while the left-hand end is to be lowered, then on opening the cock y the groups I and II are in the first instance made to communicate with each other directly. If the center of gravity of the ship is situated to the left hand of the middle of the carriage, then the ship will sink to this side, and it is therefore only necessary to close the cock y as soon as the bottom of the ship comes into horizontal position. If, on the other hand, the center of gravity of the ship is situated to the right of the middle of the carriage, it will be at once observed by the tilting motion of the ship. Then the cock y is closed, the cocks 3 and 4 are opened, and the pump 2 is set in motion. The pump then takes water from the group I and forces it into the group II, whereby the right-hand end of the ship will be made to rise and the left-hand end to sink. In this operation the pump-piston only has to overcome a pressure which is equal to the difference between the pressures in the two systems II and I.

If the left-hand end of the ship is to be raised and the right-hand end to be lowered, then the cocks 3 and 4 are closed and the cocks 6 and 8 are opened and the pump is again set in motion, which will now take water from the group II and force it into the group I in the manner indicated by the dotted arrows in Fig. 8, and by this means the desired result will be attained. The cocks 3, 4, 6, and 8 may be coupled together or be replaced by a single cock having a corresponding number of ways or by a suitably-constructed slide-valve. In addition to the pump 2 there may be provided special pumps and water-tanks serving to supply liquid to the hydraulic cylinders b and s for making good losses by leakage, &c. The pump 2 may also serve for this purpose by providing it with a suction-pipe communicating with the water-tank, so that by a suitable arrangement of the above-described cocks first the group I and then the group II can be charged with water thereby. The carriage is mainly intended for the transport of ships or boats which have a flat or slightly-bulged bottom, as in this case the supporting-belts r will mainly be strained at those parts where the bottom of the ship joins onto the sides. It is of advantage in such cases to provide between the belts and the bottom of the ship segmental filling-pieces or saddles g, Fig. 4. Should the ship's bottom be uneven, then there may be applied on top of the saddle-pieces cushions of elastic material filled with water, which would assume the shape of the bottom, and thereby uniformly distribute the pressure that is transmitted through the saddle 9. A better result, however, will be obtained by the employment of articulated bearers applied transversely on the ship's axes under each of the belts r and suspended from special suspension devices or rods 10, Fig. 5. These articulated bearers have the property of applying themselves to the bottom of the ship on this being made to rest thereon. The construction of such a transverse bearer (shown in Fig. 5) consists of the upper and lower bars 11, which by means of their articulated connection with vertical struts 12, having at their upper ends widened heads 13, constitute a number of articulated quadrangular frames. The ends of these articulated bearers are made triangular and are suspended, by means of the suspension device 10, from the hydraulic cylinders which serve for carrying the ship. The diagonals 14 of this bearer, which have the object of limiting the deflection of the bearer, consist of two parts connected together by a bolt 15, as shown at Fig. 6, the one part being formed with a slot 16 for enabling the diagonal to vary in length by the sliding together of the two parts. The bearer will assume a curved form under the action of its own weight, in which case the diagonals 14 will be fully extended and in tension. The ship n will first rest with its flat or slightly-curved bottom in the first instance upon the two points 17 of the bearer. Ships of a less width will bear upon the points 13 adjacent to 17. This pressure tends to put the bars 11 in tension. The free ends 18 of the bearer being then pressed somewhat outward in the direction of the arrows 19, the lower bars 11 will then be put under tension and will press the struts 12 with their heads against the bottom of the ship, the diagonals 14 then being relieved of tension and sliding more or less together. With this arrangement the supporting-belts r are freed from the load of the ship and only serve to steady it laterally. If, on the other hand, the transverse bearers be supported as shown at Fig. 7, so that the bands are not directly suspended from the movable part of the hydraulic cylinders, but are passed over rollers $r^5$, situated on this part, and have their ends attached to the transverse bearers, then the belts will be subject to a strain which can be varied by making the axes of the rollers $r^5$ eccentric and turning the same so as to assume any desired position. In place of the eccentric rolls there may be employed any suitable lever device or pulley-tackle. The parts 10 are in this case so arranged that they only support the bearer in the lowest position and are put out of action when the strained belts raise the transverse bearer, so as to bring it in contact with the ship's bottom.

Any sliding of the belts upon the rollers is prevented by fixing the belt to the roller at a point $r^4$, in which case the supporting device 10 can be replaced by stops, which limit the backward rotation of the eccentric rollers.

The hydraulic cylinders $s$, serving to support the ship by means of the belts $r$ and transfer the weight thereof to the carriage, can also be replaced, as shown at Figs. 9 to 11, by rollers 20, attached to the ends of the belts, which rollers are suspended by means of cords or chains 23, that are passed in a zigzag direction alternately under the rollers 20 and over fixed rollers 21, while their ends are attached at 22 to the body of the carriage. Such an arrangement of rollers and cords will act (leaving out of consideration the rigidity of the ropes and the friction of the rollers) exactly in the same manner as the supporting arrangement of hydraulic cylinders communicating with each other, as above described—that is to say, the ship will in that case always assume an accurately-horizontal position if each of the supporting-belts is subjected to the same load. If, however, this is not the case and the center of gravity of the ship does not coincide with the middle of the carriage, then the heavier end of the ship will sink, while the other end will rise. In order to obviate this disadvantage and at the same time provide means for enabling the ship to be always kept in a horizontal position, the rollers 20 of the two supporting-belts situated at the two ends of the carriage may, for instance, be supported by separate ropes 24, one end of which is connected at 25 to the carriage, while the other end is wound upon winch-drums 26, that can be rotated by a suitable motor. By means of these winches the ship can at any time be brought into or maintained in a horizontal position, taking care, however, that always only one of the two end belts is made to bear against the ship, while the other is left to hang loose. The same object can be attained by the use of two separate rollers and roping suspension systems, as shown at Figs. 10 and 11. The rope 23 is passed over the drums of a friction-windlass 27, situated at the middle of the carriage length, such windlass being capable of being driven by a motor in either direction. Thus according to the direction in which the friction-windlass is made to run the ship will be raised at the one end and lowered at the other.

Fig. 10 shows the position of the rollers when the carriage is running up an incline. Fig. 11 shows the same when the carriage is running down an incline. This arrangement operates in a similar manner to groups of hydraulic cylinders connected together by means of a reversible pump—that is to say, the greater pressure to which the end belt is subjected by an unsymmetrical load will be distributed over the entire half of the carriage.

We claim—

1. A carriage for transporting ships; comprising a suitable carriage-body, wheel-trucks, hydraulic cushions interposed between the trucks and carriage-body and in groups along its length, and means to vary the quantity of water in the cushions of the groups, for the purpose set forth.

2. A carriage for transporting ships, comprising a suitable carriage-body, wheel-trucks, hydraulic cushions interposed between the trucks and carriage and arranged in groups along the carriage, and means to vary the quantity of water in the cushions of the trucks along one side independently of those along the other, for the purpose set forth.

3. A carriage for transporting ships, comprising a suitable carriage-body, independent wheel-trucks at each side, and the trucks on each side divided into groups, interconnected variable hydraulic cushions between the trucks and carriage, and means to independently control the quantity of water in the cushions on opposite sides of the carriage.

4. A carriage for transporting ships, comprising a suitable carriage-body, wheel-trucks, hydraulic cylinders or jacks interposed between the trucks and carriage-body, pipes connecting the fluid-chambers of a plurality of jacks in series and in groups along the lengths of said carriage-body, and means for varying the volume of water in the circulating systems of said groups, for the purpose set forth.

5. A carriage for transporting ships, comprising a suitable carriage-body, wheel-trucks, hydraulic cylinders or jacks interposed between the trucks and carriage-body, pipes connecting the fluid-chambers of a plurality of jacks in series and in groups along the length of the carriage-body, and a pipe connecting the circulating system of one group with that of another, for the purpose set forth.

6. A carriage for transporting ships, comprising a suitable carriage-body, wheel-trucks at each side of the carriage-body, hydraulic cylinders or jacks interposed between the trucks and carriage-body, pipes connecting the fluid-chambers of a plurality of jacks in series and groups and means for taking water from the circulating system of a group and forcing it into the like system of another group, for the purposes set forth.

7. A carriage for transporting ships, comprising a suitable carriage-body, wheel-trucks, hydraulic cylinders or jacks interposed between the trucks and carriage-body, pipes connecting the fluid-chambers of a number of jacks in series and groups on each side of the carriage-body, a valved chamber connecting the circulating system of one group with that of another and means for forcing water into the circulating system of any of the groups, for the purpose set forth.

8. A carriage for transporting ships, comprising a suitable carriage-body, wheel-trucks, hydraulic cylinders or jacks interposed between the trucks and carriage-body, pipes connecting the fluid-chambers of the jacks on each side of the longitudinal center of the carriage into series and groups, and a pipe connecting the circulating system of the group on one side of said longitudinal center to the circulating system of the group on the opposite side, for the purpose set forth.

9. A carriage for transporting ships, comprising a suitable carriage-body, wheel-trucks, hydraulic cylinders or jacks interposed between the trucks and carriage-body, pipes connecting the fluid-chambers of the jacks on each side of the longitudinal center of said carriage-body in series and groups, and a valved pipe connecting the circulating systems of the fore and aft groups of jacks; in combination with means for taking water from the circulation of either group and forcing the same into the circulation of the other group, for the purpose set forth.

10. A carriage for transporting ships, comprising a suitable carriage-body, independent series of wheel-trucks on either side of said carriage-body, hydraulic cylinders or jacks interposed between said trucks and carriage-body, pipes connecting the fluid-chambers of the jacks on each side of the carriage and on opposite sides of its longitudinal center in series and fore and aft groups, and pipes connecting the circulating systems of each fore and aft group, for the purpose set forth.

11. A carriage for transporting ships, comprising a suitable carriage-body, independent series of wheel-trucks on each side of said body, hydraulic cylinders or jacks interposed between said trucks and carriage-body, pipes connecting the fluid-chambers of the jacks on opposite sides of the carriage-body and on opposite sides of its longitudinal center in series, and separate fore and aft groups, and valved pipes connecting the circulating systems of the fore and aft groups; in combination with means for taking water from the circulating system of a fore group and forcing it into the circulating system of an aft group and vice versa, for the purpose set forth.

12. A carriage for transporting ships, comprising a suitable wheeled carriage, driving-gears below the same on opposite sides of its transverse center, the gear-spindles, guide-wheels thereon below the drive-wheels, suitable motors on the carriage-body and transmitting mechanism transmitting power to the driving-gears; in combination with a rail having gear-teeth on opposite edges engaged by said driving-gears and a base for said rail in contact with the guide-wheels, for the purpose set forth.

13. A carriage for transporting ships, comprising a suitable carriage, a cradle held in suspension therein and means for leveling the cradle and adjusting it to any required angle, for the purpose set forth.

14. A carriage for transporting ships, comprising a suitable carriage, hydraulic supports arranged along either side thereof, each composed of two elements, a hydraulic cylinder and piston, one of said elements movable, and a cradle composed of flexible elements whose opposite ends are connected to the movable element of said supports, substantially as and for the purpose set forth.

15. A carriage for transporting ships, comprising a suitable carriage, hydraulic supports arranged along either side thereof and consisting each of two elements, one of which is movable, to wit, a hydraulic cylinder and its piston; in combination with a cradle composed of flexible elements connected in pairs at their opposite ends to the movable element of a hydraulic support, for the purpose set forth.

16. A carriage for transporting ships, comprising a suitable carriage, hydraulic supports arranged along either side thereof and consisting of two elements one of which is movable, to wit, a hydraulic cylinder and its piston, a cradle composed of flexible elements having their opposite ends connected to the movable element of the supports; in combination with braces for the bottom of the vessel and means for applying and holding said braces by the strain of the vessel on its supports, for the purpose set forth.

17. A carriage for transporting ships, comprising a suitable carriage, hydraulic supports arranged along either side thereof and consisting of two elements, one of which is movable, namely, a hydraulic cylinder and its piston, and a cradle composed of flexible elements having their opposite ends attached to the movable element of the hydraulic supports; in combination with braces for the bottom of the vessel consisting of an articulated framework of substantially quadrangular elements, said frame having triangular terminals and contractible diagonals, the vertical bars having enlarged heads for contact with the vessel's bottom and means applying said braces to the bottom of the vessel by the strain on its supports, substantially as and for the purposes set forth.

18. A carriage for transporting ships, comprising a suitable carriage, hydraulic supports arranged along either side thereof, each consisting of two elements one of which is movable, namely a hydraulic cylinder and its piston, and a roller eccentrically mounted on the movable element of each hydraulic support; in combination with braces consisting of articulated frames adapted when brought under tension to apply themselves to the inequalities of the vessel's bottom, and a cradle composed of flexible elements passing over the aforesaid eccentric rollers and having their opposite ends attached to the corresponding ends of the braces, substantially as and for the purposes set forth.

19. The combination with a carriage having side frames, means to enable the carriage to adjust itself to gradients and means to lift the carriage fore and aft; of suspending means to hold a ship in suspension between the side frames, for the purpose set forth.

20. The combination with a carriage having side frames, means to enable the carriage to adjust itself to gradients and means to lift the carriage fore and aft; of belts to hold a ship in suspension between the side frames and hydraulic cylinders to operate said belts in pairs.

21. The combination with a carriage having side frames, water-cushioned means to enable the carriage to adjust itself to gradients and means to lift the carriage fore and aft; of belts to hold a ship in suspension between the side frames, and auxiliary articulated supports capable of adjusting themselves to the contour of the bottom of the ship, for the purpose set forth.

In testimony that we claim the foregoing as our invention we have signed our names in presence of the subscribing witnesses.

BERNHARD KIRSCH.
CARL VICTOR SUPPAN.
BÉLA SZENDI.

Witnesses as to signatures of Bernhard Kirsch and Carl Victor Suppan:
JOS. RUBRESCH,
ALVESTO S. HOGUE.

Witnesses as to signature of Béla Szendi:
LOUIS VANDORN,
F. LOGUARDIO.